US012712168B2

(12) United States Patent

Kang et al.

(10) Patent No.: US 12,712,168 B2
(45) Date of Patent: Aug. 18, 2026

(54) MASS SPECTROMETER

(71) Applicant: YOUNG IN ACE Co., Ltd., Anyang-si (KR)

(72) Inventors: Sungwon Kang, Anyang-si (KR); Hun Lee, Anyang-si (KR); Yoon Jin Jeong, Anyang-si (KR); Ju Woo, Anyang-si (KR); Hyun-Sang Lee, Anyang-si (KR); Jingeun Rhee, Anyang-si (KR)

(73) Assignee: YOUNG IN ACE Co., Ltd., Anyang-si (KR)

( * ) Notice: Subject to any disclaimer, the term of this patent is extended or adjusted under 35 U.S.C. 154(b) by 279 days.

(21) Appl. No.: 18/715,324

(22) PCT Filed: Dec. 1, 2022

(86) PCT No.: PCT/KR2022/019404
§ 371 (c)(1),
(2) Date: May 31, 2024

(87) PCT Pub. No.: WO2023/101485
PCT Pub. Date: Jun. 8, 2023

(65) Prior Publication Data

US 2025/0029825 A1 Jan. 23, 2025

(30) Foreign Application Priority Data

Dec. 2, 2021 (KR) ........................ 10-2021-0171069

(51) Int. Cl.
*H01J 49/06* (2006.01)
*H01J 49/04* (2006.01)

(52) U.S. Cl.
CPC .......... *H01J 49/067* (2013.01); *H01J 49/045* (2013.01)

(58) Field of Classification Search
CPC ........ H01J 49/06; H01J 49/045; H01J 49/067; H01J 49/145; H01J 49/168; H01J 49/0404; H01J 49/0422; H01J 49/0477
See application file for complete search history.

(56) References Cited

U.S. PATENT DOCUMENTS 5,349,186 A * 9/1994 Ikonomou ............. H01J 49/167 250/288
5,485,016 A * 1/1996 Irie ..................... H01J 49/0422 250/281

(Continued)

FOREIGN PATENT DOCUMENTS

JP 2516840 B2 7/1996
JP H 10142155 A 5/1998

(Continued)

OTHER PUBLICATIONS

International Preliminary Report on Patentability, mailed on May 2, 2024, from International Application No. PCT/KR2022/019404, filed on Dec. 1, 2022. 11 pages.

(Continued)

*Primary Examiner* — Tung X Le
(74) *Attorney, Agent, or Firm* — HoustonHogle LLP

(57) ABSTRACT

The present invention provides a mass spectrometer includes a sample introduction part, an ionization part connected to the sample introduction part and configured to ionize the sample introduced from the sample introduction part, an ion lens part including an extraction lens structure adjacent to the ionization part and first and second guiding lenses configured to guide an ion beam extracted from the extraction lens structure, and a detection part configured to detect the ion beam, wherein a central axis of the extraction lens structure is a first axis extending in a first direction, a central axis of the first guiding lens is a second axis spaced a first (Continued)

distance from the first axis, and a central axis of the second guiding lens is a third axis spaced a second distance from the second axis.

15 Claims, 8 Drawing Sheets

(56) References Cited

U.S. PATENT DOCUMENTS

| | | | | |
|---|---|---|---|---|
| 7,977,649 | B2 | 7/2011 | Hirano | |
| 8,796,638 | B2 | 8/2014 | Shaw et al. | |
| 9,048,079 | B2 * | 6/2015 | Krutchinsky | H01J 49/062 |
| 9,697,999 | B2 * | 7/2017 | Makarov | H01J 49/26 |
| 10,658,167 | B2 | 5/2020 | Gamble et al. | |
| 10,854,438 | B2 | 12/2020 | Yamada et al. | |
| 11,031,224 | B2 | 6/2021 | Wang et al. | |
| 2009/0039282 | A1 * | 2/2009 | Haase | H01J 49/164 250/282 |
| 2009/0266984 | A1 | 10/2009 | Hirano | |
| 2010/0059675 | A1 * | 3/2010 | Mukaibatake | H01J 49/065 250/288 |
| 2011/0147575 | A1 | 6/2011 | Mordehai et al. | |
| 2014/0103206 | A1 | 4/2014 | Mukaibatake et al. | |
| 2016/0163528 | A1 | 6/2016 | Splendore et al. | |
| 2018/0315589 | A1 * | 11/2018 | Oshiro | H01J 49/401 |
| 2019/0326108 | A1 * | 10/2019 | Brown | H01J 49/0404 |
| 2020/0135443 | A1 * | 4/2020 | Itagaki | H01J 49/0036 |
| 2021/0193448 | A1 * | 6/2021 | Matsuda | H01J 49/06 |

FOREIGN PATENT DOCUMENTS

| | | | |
|---|---|---|---|
| JP | H 10144252 | A | 5/1998 |
| JP | 2000214149 | A | 8/2000 |
| JP | 2001185073 | | 7/2001 |
| JP | 2001202917 | | 7/2001 |
| JP | 2004071470 | A | 3/2004 |
| JP | 2005251546 | A | 9/2005 |
| JP | 5469823 | B2 | 4/2014 |
| JP | 2014516200 | | 7/2014 |
| JP | 2019164135 | A | 9/2019 |
| JP | 2020518106 | | 6/2020 |
| JP | 2020535622 | A | 12/2020 |
| KR | 20220075828 | A | 6/2022 |
| WO | WO2016067373 | | 5/2016 |

OTHER PUBLICATIONS

Written Opinion of the International Searching Authority, mailed on Feb. 28, 2023, from International Application No. PCT/KR2022/019404, filed on Dec. 1, 2022. 4 pages.

International Search Report of the International Searching Authority, mailed on Feb. 28, 2023, from International Application No. PCT/KR2022/019404, filed on Dec. 1, 2022. 6 pages.

* cited by examiner

MASS SPECTROMETER

RELATED APPLICATIONS

This application is a § 371 National Phase Application of International Application No. PCT/KR2022/019404, filed on Dec. 1, 2022, now International Publication No. WO 2023/101485 A1, published on Jun. 8, 2023, which International Application claims priority to Korean Application No. 10-2021-0171069, filed on Dec. 2, 2021, both of which are incorporated herein by reference in their entirety.

TECHNICAL FIELD

The present invention relates to a mass spectrometer, and more specifically, an extraction lens structure having a first central axis, a first guiding lens having a second central axis spaced apart from the first central axis, and a first guiding lens spaced apart from the second central axis. It relates to a mass spectrometer including a second guiding lens having a central axis.

BACKGROUND ART

In order to check a process status at a semiconductor manufacturing site, there is a need for a method to measure and analyze a concentration and distribution of various ions or elements. In addition, as air and water pollution are accelerated, there is a need for methods to measure and analyze the level of pollution at environmental sites. A mass spectrometer may be used for the measurement and analysis.

A mass spectrometer is an instrument that identifies or analyzes chemical agents, etc. through mass analysis. The mass spectrometer may analyze components of a sample by measuring a mass of a substance at a mass-to-charge ratio. The samples may be ionized within the mass spectrometer using a variety of methods. The ionized sample may be accelerated while passing through electric and/or magnetic fields. That is, a path of a portion or whole of the ionized sample may be bent by the electric fields and/or magnetic fields. A detector may detect the ionized sample.

DISCLOSURE OF THE INVENTION

Technical Problem

One technical object of the present invention is to provide a mass spectrometer having high transmission efficiency of ions to be analyzed and improved resolution and measurement accuracy.

Technical objects to be solved by the present invention are not limited to the aforementioned technical objects and unmentioned technical objects will be clearly understood by those skilled in the art from the specification and the appended claims.

Technical Solution

In order to solve the above-mentioned technical problems, a mass spectrometer according to an embodiment of the present invention includes a sample introduction part, an ionization part connected to the sample introduction part and configured to ionize the sample introduced from the sample introduction part, an ion lens part including an extraction lens structure adjacent to the ionization part and first and second guiding lenses configured to guide ion beam extracted from the extraction lens structure; and a detection part configured to detect ion beam, wherein a central axis of the extraction lens structure is a first axis extending in a first direction, a central axis of the first guiding lens is a second axis spaced a first distance from the first axis, and a central axis of the second guiding lens is a third axis spaced a second distance from the second axis.

The internal space of the first guiding lens may include: a first space extending from a front opening of the first guiding lens in the first direction; a second space extending from the first space in a direction inclined with respect to the first direction; and a third space extending from the second space to a rear opening of the first guiding lens in the first direction.

The central axis of the first space may coincide with the first axis, the central axis of the second space may have an inclination with respect to the first axis and intersects the second axis, and the central axis of the third space may coincide with the third axis.

The first guiding lens may include a plurality of ion lenses having a uniform aperture width.

The first guiding lens may include a first portion between the extraction lens structure and the second guiding lens and a second portion integrally connected to the first portion between the first portion and the second guiding lens, wherein the first portion may have a shape similar to a hollow pillar shape cut along a plane comprising the central axis thereof, the second portion may have a hollow pillar shape, and the second axis may be defined as a central axis of an internal space of the second portion.

A lower portion of the first portion may be opened toward an empty space between the extraction lens structure and the second portion.

The second portion may be in contact with the second guiding lens.

The second guiding lens may have a plate shape having a through-hole, and the third axis may be defined as a central axis of the through-hole.

Each of the first distance and the second distance may be 1 mm to 3 mm.

The second distance may be less than the first distance.

The mass spectrometer may further include an interface part between the ionization part and the ion lens part and a mass separation part between the ion lens part and the detection part.

The extraction lens structure may include a first extraction lens adjacent to the interface part and a second extraction lens between the first extraction lens and the first guiding lens, wherein each of the first and second extraction lenses has a hollow cone shape.

The first extraction lens may have at least one or more side openings passing through a sidewall thereof to expose an inner sidewall thereof.

The sample introduction part may include: a nebulizer configured to change a liquid sample into an aerosol state; and a spray chamber connected to the nebulizer and configured to control a flow of aerosols so that only relatively small-sized aerosols move to the ionization part through a temperature control.

The ionization part may include: a first tube connected to the spray chamber of the sample introduction part and disposed at the innermost side; a third tube having an end facing the ion lens part and disposed at the outermost side; a second tube disposed between the first tube and the third tube; and an induction coil having a spiral shape that surrounds the outside of the third tube.

Advantageous Effects

The mass spectrometer according to the present invention may improve the transmission efficiency of the ions to be analyzed by the ion lens part including the extraction lens structure having the first central axis, the first guiding lens having the second central axis spaced apart from the first central axis, and the third central axis spaced apart from the second central axis. Therefore, the resolution and measurement accuracy of the mass spectrometer according to the present invention may be improved.

BEST MODE FOR CARRYING OUT THE INVENTION

Figure 2:
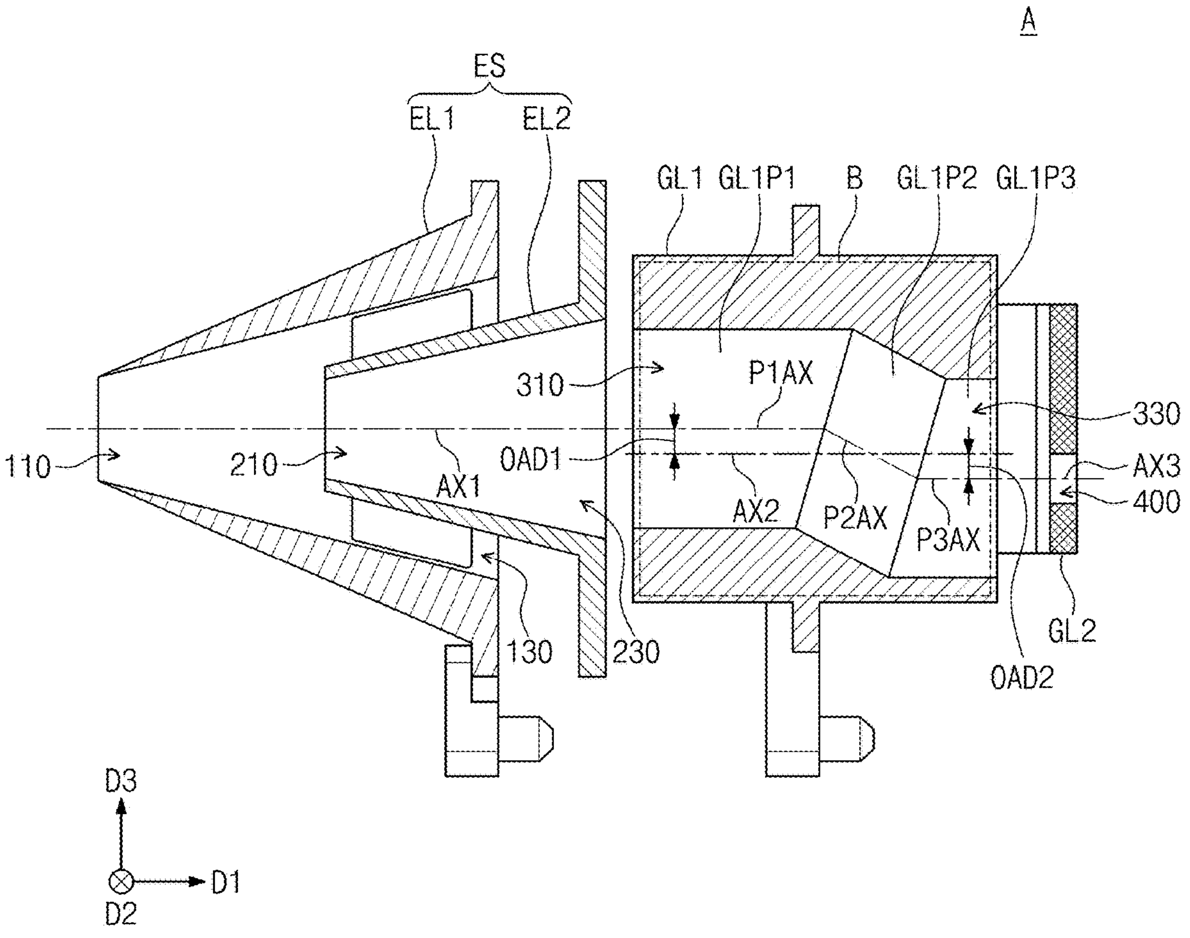
FIG. 2 is an enlarged view for explaining the ion lens part of the mass spectrometer, which corresponds to a portion A of FIG. 1, according to an embodiment of the present invention.

The best mode for carrying out the present invention is illustrated in FIG. 2.

MODE FOR CARRYING OUT THE INVENTION

Embodiments of the present invention will be described with reference to the accompanying drawings so as to sufficiently understand constitutions and effects of the present invention.

The present invention is not limited to the embodiments disclosed below, but should be implemented in various forms, and various modifications and changes may be made. Rather, these embodiments are provided so that this disclosure will be thorough and complete, and will fully convey the scope of the present invention to those skilled in the art. Further, the present invention is only defined by the scope of the claims. In the accompanying drawings, the components are shown enlarged for the sake of convenience of explanation, and the proportions of the components may be exaggerated or reduced for clarity of illustration.

In the following description, the technical terms are used only for explaining a specific exemplary embodiment while not limiting the present invention. Unless terms used in embodiments of the present invention are differently defined, the terms may be construed as meanings that are commonly known to a person skilled in the art.

In this specification, the terms of a singular form may comprise plural forms unless specifically mentioned. The meaning of 'comprises' and/or 'comprising' specifies a component, a step, an operation and/or an element does not exclude other components, steps, operations and/or elements.

When a layer is referred to herein as being 'on' another layer, it may be formed directly on the top of the other layer or a third layer may be interposed between them.

It will be understood that although the terms first and second are used herein to describe various regions, layers, and the like, these regions and layers should not be limited by these terms. These terms are used only to discriminate one region or layer from another region or layer. Therefore, a portion referred to as a first portion in one embodiment can be referred to as a second portion in another embodiment. An embodiment described and exemplified herein includes a complementary embodiment thereof. Like reference numerals refer to like elements throughout.

Hereinafter, embodiments of a mass spectrometer according to the present invention will be described in detail with reference to the drawings.

Figure 1:
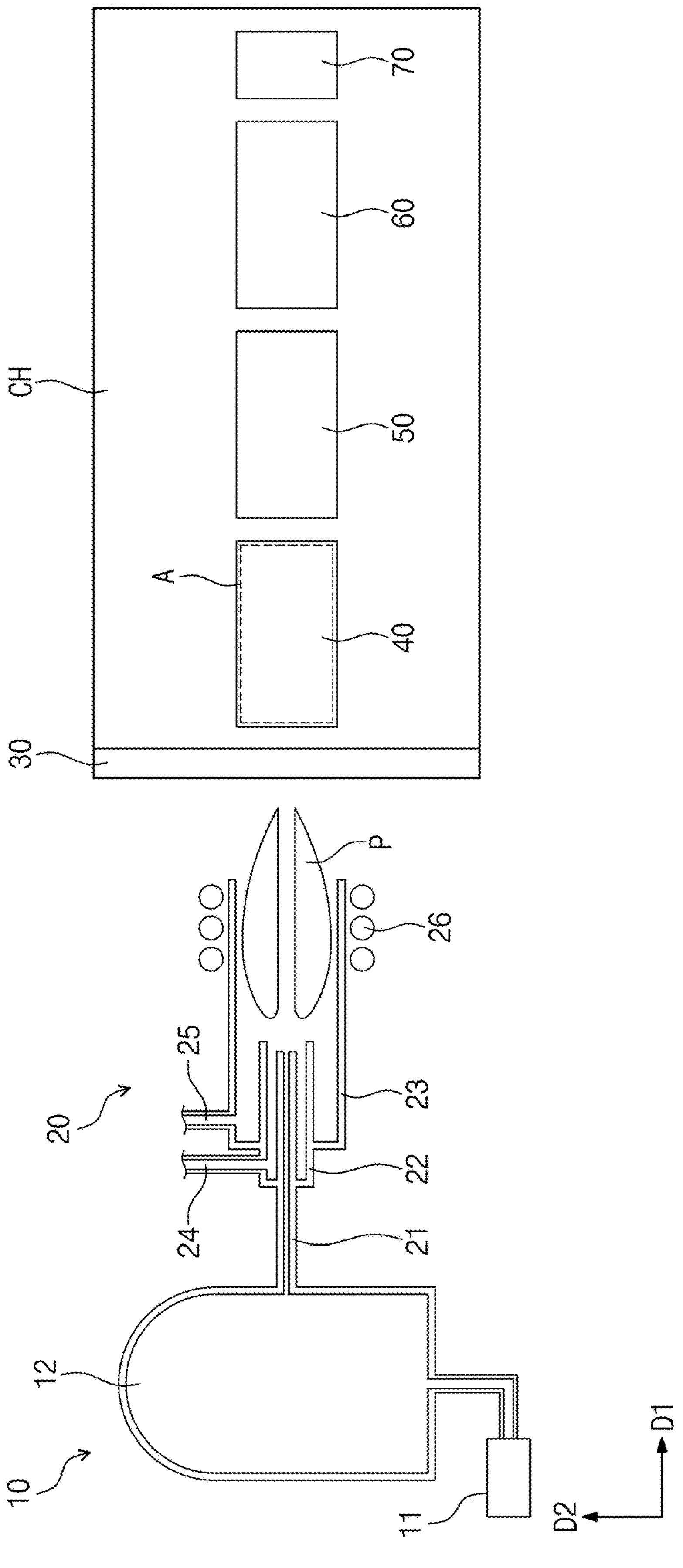
FIG. 1 is a conceptual view for explaining a mass spectrometer according to embodiments of the present invention.

FIG. 1 is a conceptual view for explaining a mass spectrometer according to embodiments of the present invention.

Referring to FIG. 1, a mass spectrometer according to the present invention may include a sample introduction part 10, an ionization part 20, an interface part 30, an ion lens part 40, a reaction part 50, a mass separation part 60, and a detection part 70. The mass spectrometer according to the present invention is shown and described as a mass spectrometer using inductively coupled plasma (ICP), but this is only illustrative, and the present invention is not limited thereto, and thus, the mass spectrometer according to the present invention may be a variety of mass spectrometers including the ion lens part 40, which is shown and described below.

The sample introduction part 10 may include a nebulizer 11 and a spray chamber 12. The nebulizer 11 may change a liquid sample into an aerosol state to inject the aerosol sample into the spray chamber 12. The spray chamber 12 may be connected to the nebulizer 11. The spray chamber 12 may reduce sample fluctuations and constantly maintain a size and amount of the sample moving to the ionization part 20, which will be described later. Particularly, the spray chamber 12 may remove relatively large aerosols through temperature control and may control a flow of aerosols so that only relatively small aerosols move to the ionization part 20. According to embodiments, a carrier gas may be supplied to the nebulizer 11 and/or the spray chamber 12 through at least one gas supply pipe. The carrier gas may allow the sample to be introduced into plasma P.

The ionization part 20 may be connected to the sample introduction part 10. The ionization part 20 may be referred to as, for example, a plasma torch. The ionization part 20 may include a first tube 21, a second tube 22, a third tube 23, and an induction coil 26.

The first tube 21 may be connected to the spray chamber 12 of the sample introduction part 10 and may be disposed at the innermost side of the ionization part 20. The third tube 23 may be disposed at the outermost side of the ionization part 20, and the second tube 22 may be disposed between the first tube 21 and the third tube 23. The second tube 22 and the third tube 23 may be connected to a first gas supply pipe 24 and a second gas supply pipe 25, respectively. Each of the first to third tubes 201, 202, and 203 may have a hollow pillar shape extending in a first direction D1. Each of the first to third tubes 201, 202, and 203 may have a concentric circular shape in which central axes coincide with each other in terms of a cross-sectional area cut along a plane perpendicular to the first direction D1. Each of the first to third tubes 201, 202, and 203 may be made of, for example, quartz, alumina, platinum, or sapphire.

The sample and carrier gas may move through the first tube 21, an auxiliary gas may move through the first gas supply pipe 24 and the second tube 22, and the second gas supply pipe 25 and the third tube 23 may allow a cooling gas to move. The auxiliary gas may prevent or minimize ends of the first and second tubes 201 and 202 from being damaged due to contact with the plasma P. The cooling gas may prevent or minimize an inner wall of the third tube 23 from being damaged due to contact with the plasma P. Each of the carrier gas, the auxiliary gas, and the cooling gas may include, for example, argon (Ar).

For example, the induction coil 26 may have a spiral shape that surrounds the outside of the third tube 23 at least twice. The induction coil 26 may generate strong electromagnetic fields that are changed temporally inside the ionization part 20. The electromagnetic fields generated by the induction coil 26 may generate the plasma P by discharging the gas therein. The high temperature plasma P may ionize the aerosol sample introduced from the sample introduction part 10.

According to embodiments, the ionization part 20 may further include a high-power RF power source connected to the induction coil 26 and a shielding plate between the induction coil 26 and an outer wall of the third tube 23.

The interface part 30 may extract an ionized sample from the plasma P generated in the ionization part 20 in the form of ion beam. The interface part 30 may be adjacent to the ionization part 20 in the first direction D1. The interface part 30 may be connected to the chamber CH. The interface part 30 may be provided between the ionization part 20 and the chamber CH. The interface part 30 may include a sampler cone and a skimmer cone that extract the ion beam. For example, each of the sampler cone and the skimmer cone may have a hollow cone shape of which a width in the second direction D2 increases as it moves toward the first direction D1.

The ion lens part 40, the reaction part 50, the mass separation part 60, and the detection part 70 may be provided inside the chamber CH. The inside of the chamber CH may be maintained in a vacuum state. At least one of the ion lens part 40, the reaction part 50, the mass separation part 60, or the detection part 70 may be provided, for example, in sub-chambers within the chamber CH, and the sub-chambers may be maintained in a vacuum state different from the inside of the chamber CH. The ion lens part 40, the reaction part 50, the mass separation part 60, and the detection part 70 may be arranged, for example, along the first direction D1, but the present invention is not limited thereto.

The ion lens part 40 may be provided between the interface part 30 and the reaction part 50. According to embodiments, at least a portion of the ion lens part 40 may be connected to and/or overlap the interface part 30. The ion lens part 40 may include at least one lens and may block photons, neutral particles, etc. through one or more lenses and control a path of ions that are targets to be analyzed (hereinafter, referred to as ions to be analyzed). Hereinafter, a detailed configuration of the ion lens part 40 will be described in detail with reference to FIGS, FIGS. 2, 3, and 6.

The reaction part 50 may be provided between the ion lens part 40 and the mass separation part 60. The reaction part 50 may be referred to as a collision/reaction cell. According to embodiments, the collision/reaction gas may be supplied to the reaction part 50 through at least one gas supply pipe. The collision/reaction gas may collide with various ions inside the reaction part 50 and convert interfering ions (e.g., 40Ar, 40Ar16O, 38ArH, etc.) into non-interfering species or convert ions to be analyzed to ions having a different mass.

The mass separation part 60 may be provided between the reaction part 50 and the detection part 70. The mass separation part 60 may use, for example, a quadrupole method, a double focusing magnetic sector method, or a time-of-flight method and may separate ions according to a mass-to-charge ratio (m/z). Unlike that shown, another mass separation part 60 may be additionally provided between the ion lens part 40 and the reaction part 50.

The detection part 70 may be adjacent to an end of the mass separation part 60 and may detect a mass spectrum of the ions to be analyzed that are separated in the mass separation part 60. The detection part 70 may use, for example, a channel electron multiplier, a Faraday cup, or a discrete dynode electron multiplier.

Figure 3:
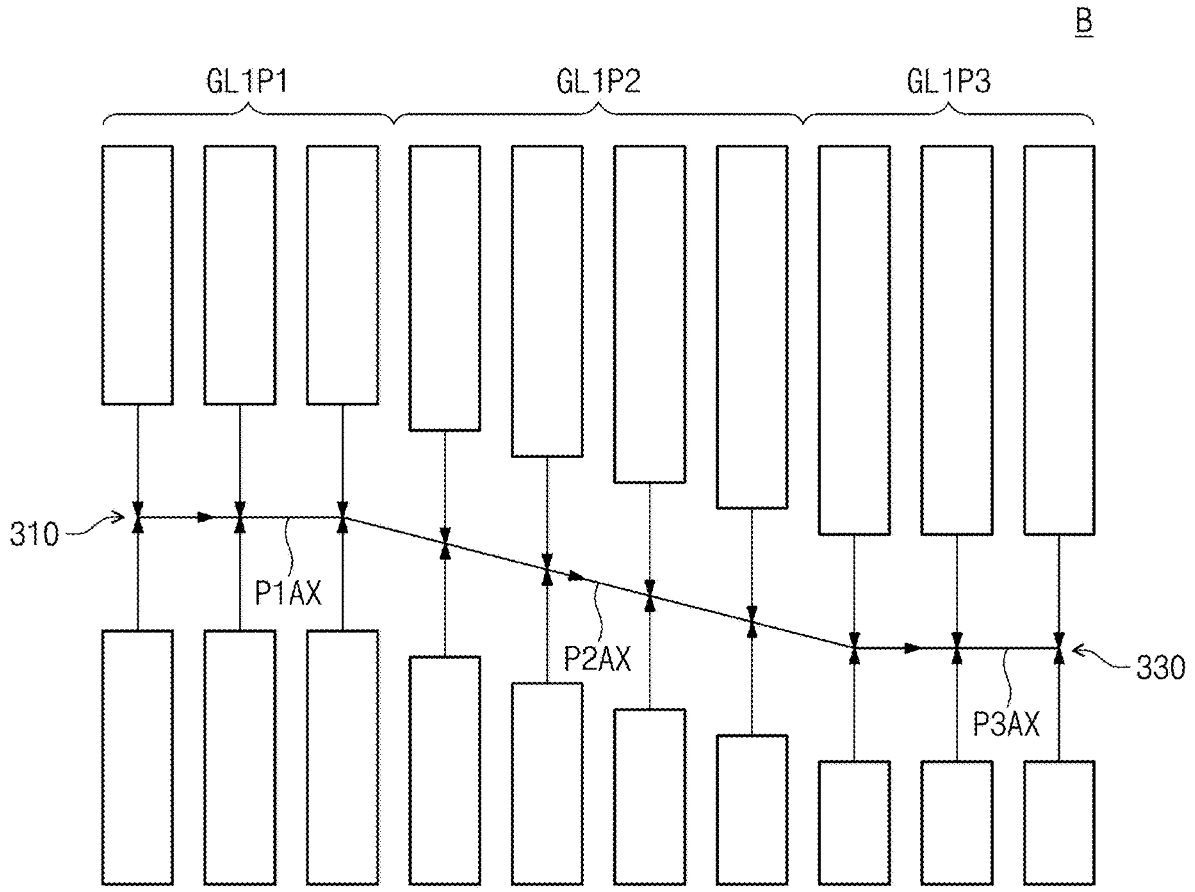
FIG. 3 is an enlarged view for explaining the ion lens part of the mass spectrometer, which corresponds to a portion B of FIG. 2, in more detail according to an embodiment of the present invention.

FIG. 2 is an enlarged view for explaining the ion lens part of the mass spectrometer, which corresponds to a portion A of FIG. 1, according to an embodiment of the present invention. FIG. 3 is an enlarged view for explaining the ion lens part of the mass spectrometer, which corresponds to a portion B of FIG. 2, in more detail according to an embodiment of the present invention.

Referring to FIGS. 1 and 2, the ion lens part 40 of the mass spectrometer according to the present invention may include an extraction lens structure ES, a first guiding lens GL1, and a second guiding lens GL2. The extraction lens structure ES may include a first extraction lens EL1 and a second extraction lens EL2. The first extraction lens EL1, the second extraction lens EL2, the first guiding lens GL1, and the second guiding lens GL2 may be arranged along the first direction D1. Here, the number of extraction lenses EL1 and EL2 and the number of guiding lenses GL1 and GL2 are merely examples, and the present invention is not limited thereto.

The extraction lens structure ES may be disposed adjacent to the interface part 30. The first extraction lens EL1 may be provided between the interface part 30 and the second extraction lens EL2, and the second extraction lens EL2 may be provided between the first extraction lens EL1 and the first guiding lens GL1. For example, each of the first and second extraction lenses EL1 and EL2 may have a hollow cone shape of which a width in the second direction D2 and a third direction D3 increases as it moves toward the first direction D1.

A central axis of each of the first and second extraction lenses EL1 and EL2 (i.e., a central axis of each of the first and second extraction lenses EL1 and EL2) may coincide with a first axis AX1 extending in the first direction D1. A central axis of the first extraction lens EL1 may coincide with a central axis of the second extraction lens EL2. Each of the first and second extraction lenses EL1 and EL2 may have a symmetrical shape about the first axis AX1. Each of the first and second extraction lenses EL1 and EL2 may have openings in front and rear surfaces thereof. In this specification, the front surface may refer to a surface facing the ionization part 20 and the interface part 30 (i.e., a direction opposite to the first direction D1), and the rear surface may refer to a surface facing the reaction part 50 (i.e., the first direction D1). The front and rear surfaces may be surfaces perpendicular to the first direction D1 and parallel to the second direction D2 and the third direction D3.

The first extraction lens EL1 may have a first front opening 110 facing the interface part 30 and a first rear opening 130 facing the first guiding lens GL1. A diameter of the first front opening 110 may be less than that of the first rear opening 130. According to embodiments, the first extraction lens EL1 may have at least one or more side openings that pass through a sidewall thereof and exposes an inner sidewall thereof, but the present invention is not limited thereto.

The second extraction lens EL2 may include a second front opening 210 facing the first front opening 110 of the first extraction lens EL1 and a second rear opening 230 facing the first guiding lens GL1. A diameter of the second front opening 210 may be less than that of the second rear opening 230. The diameter of the second front opening 210 may be less than that of the first rear opening 130.

At least a portion of the second extraction lens EL2 may overlap the first extraction lens EL1 in the second direction D2. In other words, at least a portion of the second extraction lens EL2 may be disposed inside the first extraction lens EL1.

First voltage apply parts may be connected to the first and second extraction lenses EL1 and EL2, respectively. According to embodiments, the first voltage apply parts may be adjacent to the first rear opening 130 of the first extraction lens EL1 and the second rear opening 230 of the second extraction lens EL2, respectively. The first and second extraction lenses EL1 and EL2 may extract ion beam passing through the ionization part 20 and the interface part 30 by voltages applied to the first voltage apply parts, respectively.

The first and second guiding lenses GL1 and GL2 may be disposed adjacent to the reaction part 50. The first guiding lens GL1 may be provided between the extraction lens structure ES and the second guiding lens GL2, and the second guiding lens GL2 may be provided between the first guiding lens GL1 and the reaction part 50. According to embodiments, the first guiding lens GL1 may be spaced apart from the second extraction lens EL2 of the extraction lens structure ES in the first direction D1. Each of the first and second guiding lenses GL1 and GL2 may have openings in front and rear surfaces thereof.

The first guiding lens GL1 may have a third front opening 310 facing the second rear opening 230 of the second extraction lens EL2 and a third rear opening 330 facing the second guiding lens GL2. A diameter of the third front opening 310 may be substantially the same as a diameter of the third rear opening 330.

A central axis of the internal space of the first guiding lens GL1 extending from the third front opening 310 to the third rear opening 330 may be defined as a second axis AX2 extending in the first direction D1 and spaced apart from the first axis AX1 in the third direction D3. A distance between the second axis AX2 and the highest point of the third front opening 310 may be equal to a distance between the second axis AX2 and the lowest point of the third rear opening 330. In this specification, the central axis of the first guiding lens GL1 may refer to a central axis of the internal space of the first guiding lens GL1. The second axis AX2 may be spaced a first distance OAD1 from the first axis AX1 in the third direction D3. The first distance OAD1 may be, for example, about 1 mm to about 3 mm.

The internal space of the first guiding lens GL1 may include a first space GL1P1 extending from the third front opening 310 in the first direction D1, a second space GL1P2 extending from the first space GL1P1 in a direction inclined with respect to the first direction D1, and a third space GL1P3 extending from the second GL1P2 to the third rear opening 330 in the first direction D1.

A central axis P1AX of the first space GL1P1 may coincide with the first axis AX1. A central axis P2AX of the second space GL1P2 may have an inclination with respect to the first axis AX1. The central axis P2AX of the second space GL1P2 may intersect the second axis AX2. A central axis P3AX of the third space GL1P3 may have an inclination with respect to the central axis P2AX of the second space GL1P2 and may be parallel to the central axis P1AX of the first space GL1P1.

Referring to FIG. 3, the first guiding lens GL1 may be a set of a plurality of ion lenses having a uniform aperture width. Here, the central axis P1AX of the first space GL1P1 may be a line connecting centers of the openings of the first space GL1P1 to each other, the central axis P2AX of the second space GL1P2 may be a line connecting centers of the openings of the second space GL1P2 to each other, and the central axis P3AX of the third space GL1P3 may be a line connecting centers of the openings of the third space GL1P3 to each other. The openings of the plurality of ion lenses may be arranged between the third front opening 310 and the third rear opening 330. Here, an intensity of electric fields may be uniform at the central axis P1AX of the first space GL1P1, the central axis P2AX of the second space GL1P2, and the central axis P3AX of the third space GL1P3.

Referring again to FIGS. 1 and 2, the second guiding lens GL2 may have a plate shape having a through-hole 400 passing through one area thereof. The second guiding lens GL2 having the plate shape may attract analysis target ions of which a path is bent by the first guiding lens GL1 through the through-hole 400 without a loss. A central axis of the through-hole 400 may be defined as a third axis AX3. In this specification, the central axis of the second guiding lens GL2 may refer to the central axis of the through-hole 400. The third axis AX3 may coincide with the central axis P3AX of the third space GL1P3 of the first guiding lens GL1. The third axis AX3 may be parallel to the first axis AX1. The third axis AX3 may be spaced a second distance OAD2 from the second axis AX2 in the third direction D3. The second distance OAD2 may be, for example, about 1 mm to about 3 mm. According to embodiments, the second distance OAD2 may be different from the first distance OAD1. For example, the second distance OAD2 may be less than the first distance OAD1, but the present invention is not limited thereto.

Second voltage apply parts may be connected to the first and second guiding lenses GL1 and GL2, respectively. The first and second guiding lenses GL1 and GL2 may control a path of the ion beam passing through the first and second extraction lenses EL1 and EL2 by voltages applied to the second voltage apply parts, respectively. The voltage of each of the second voltage apply parts may be adjusted to determine an optimal path for each energy of the ions.

Particularly, in the ion beams passing through the first and second extraction lenses EL1 and EL2, the ions having electric charges may have a path bent by the voltage applied to each of the second voltage apply parts and be directed to the reaction part 50 through the through-hole 400 of the second guiding lens GL2, and photons, neutral particles, etc., which travel in a straight line, may proceed in the first direction D1 along the first axis AX1 and be blocked without passing through the rear opening of the second guiding lens GL2. The first and second guiding lenses GL1 and GL2 of the mass spectrometer according to the present invention may block the photons, the neutral particles, the metastable ions, etc. and control the path of the ions to be analyzed. Thus, measurement accuracy of the mass spectrometer according to the present invention may be improved.

Figure 4:
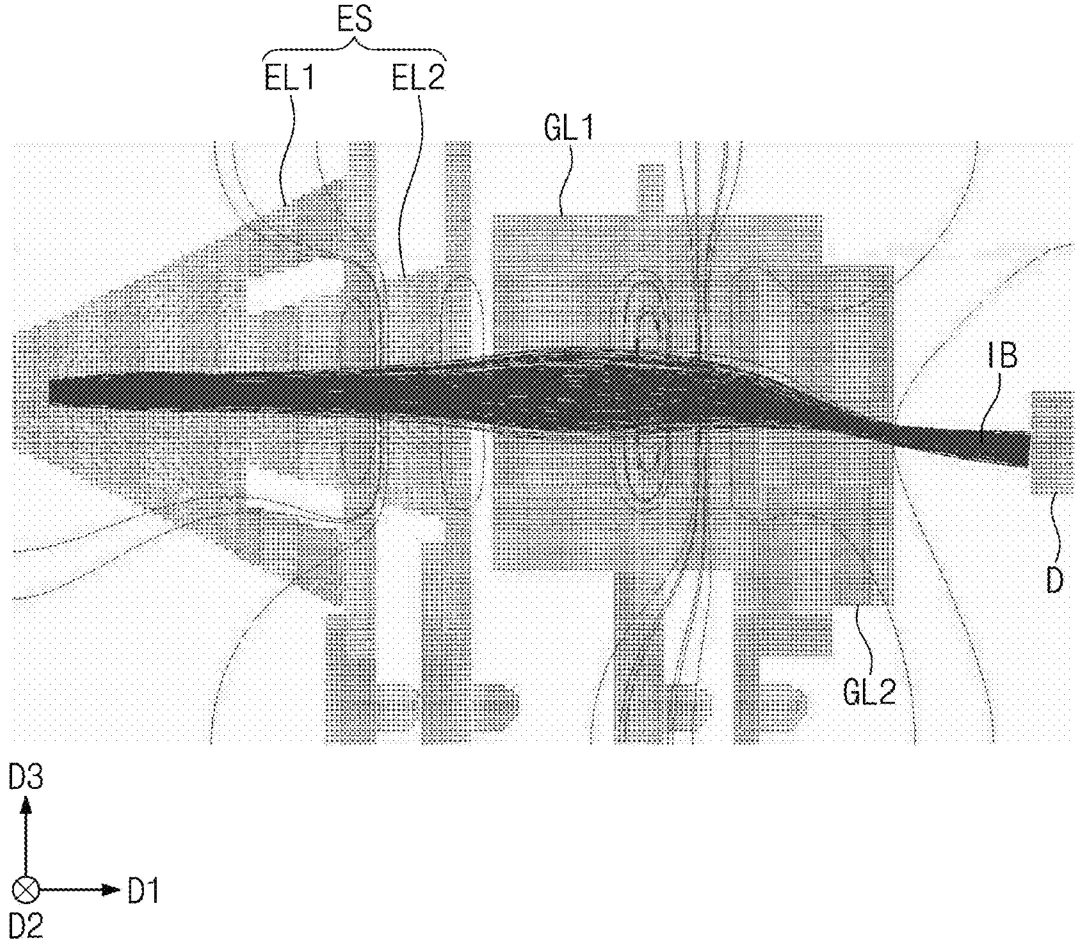
FIGS. 4 and 5 are simulation pictures for explaining a path and transmission efficiency of ion beam within the ion lens part of the mass spectrometer according to an embodiment of the present invention.
Figure 5:
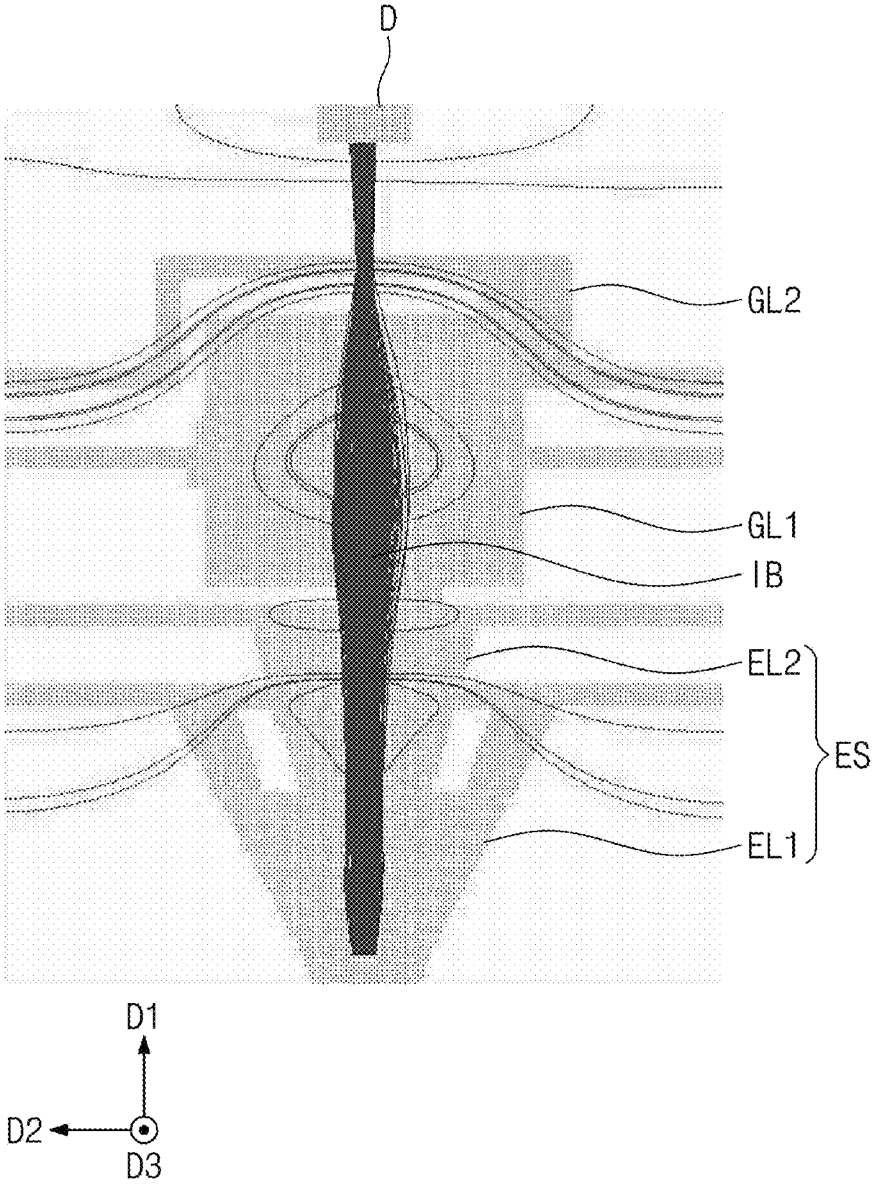

FIGS. 4 and 5 are simulation pictures for explaining a path and transmission efficiency of ion beam within the ion lens part of the mass spectrometer according to an embodiment of the present invention.

More particularly, FIG. 4 is a simulation diagram illustrating a cross section cut along a plane parallel to the first direction D1 and the third direction D3, and FIG. 5 is a simulation diagram illustrating a cross section cut along a plane parallel to the first direction D1 and the second direction D2. Here, current due to a space charge effect may be about 2 μA, and ion beam IB containing ions to be analyzed was set to have a mass range of about 40 amu (atomic mass unit) to about 238 amu.

In FIGS. 4 and 5, it is illustrated and explained that a detector D is disposed at a rear end for the purpose of measuring transmittance efficiency of ions passing through the ion lenses EL1, EL2, GL1, and GL2, but the mass spectrometer according to the present invention is not limited thereto, and the reaction part 50 (see FIG. 1) and the mass separation part 60 (see FIG. 1) may be provided between the ion lenses EL1, EL2, GL1, and GL2 and the detector D.

Referring to FIGS. 4 and 5, in the simulation, the ion beam IB may reach the detector D with a transmittance efficiency of 100%. In other words, the ion beam IB may wholly proceed to the detector D by the extraction lens structure ES having the first axis AX1 as the central axis thereof, the first guiding lens GL1 having the second axis AX2 spaced apart from the first axis AX1 as the central axis thereof, and the second guiding lens GL2 having the third axis AX3, which is spaced apart from the second axis AX2, as the central axis thereof. At a front end of the second guiding lens GL2, a width of the ion beam IB in the third direction D3 may be less than or equal to a width of the through-hole 400 (see FIG. 2) of the second guiding lens GL2 in the third direction, and a width of the ion beam IB in the second direction D2 may be less than or equal to a width of the through-hole 400 (see FIG. 2) of the second guiding lens GL2 in the second direction D2.

The mass spectrometer according to the present invention may improve resolution and measurement accuracy by improving transmission efficiency of the ions to be analyzed.

Figure 6:
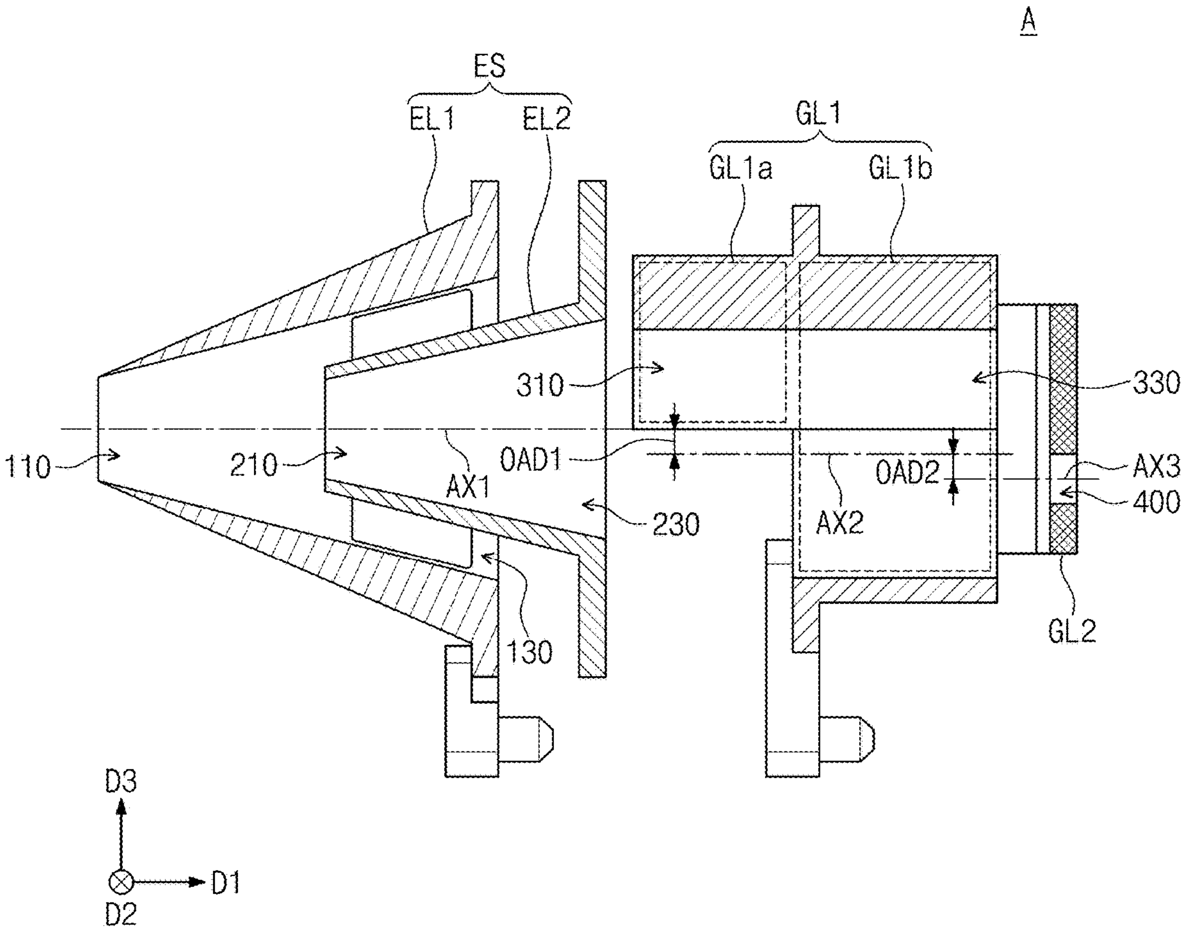
FIG. 6 is an enlarged view for explaining the ion lens part of the mass spectrometer, which corresponds to a portion A of FIG. 1, according to an embodiment of the present invention.

FIG. 6 is an enlarged view for explaining a ion lens part of a mass spectrometer, which corresponds to a portion A of FIG. 1, according to another embodiment of the present invention. Hereinafter, for convenience of description, descriptions of the contents that are substantially the same as those described with reference to FIGS. 2 and 3 will be omitted, and differences will be described in detail.

Referring to FIGS. 1 and 6, the first guiding lens GL1 may include, for example, a first portion GL1*a* provided between the second extraction lens EL2 and the second guiding lens GL2 and a second portion GL1*b* integrally connected to the first portion GL1*b* and provided between the first portion GL1*a* and the second guiding lens GL2. The second portion GL1*b* may be connected to a rear surface of the first portion GL1*a* so as to be integrated with each other. The first portion GL1*a* may be spaced apart from the second extraction lens EL2 in the first direction D1. The second portion GL1*b* may be in contact with the second guiding lens GL2.

The first portion GL1*a* may have a shape similar to a hollow pillar cut along a plane including a central axis thereof. The second portion GL1*b* may have a hollow pillar shape (e.g., a hollow cylinder shape). A lower part of the first portion GL1*a* may be opened toward an empty space between the second extraction lens EL2 and the second portion GL1*b*, and an upper portion of the first portion GL1*a* may be blocked from the outside. In this specification, the lower portion may refer to a portion facing an opposite direction of the third direction D3, and the upper portion may refer to a portion facing the third direction D3. The empty space may be provided between the second extraction lens EL2 and the second portion GL1*b* to stabilize the path of the ions to be analyzed.

Figure 7:
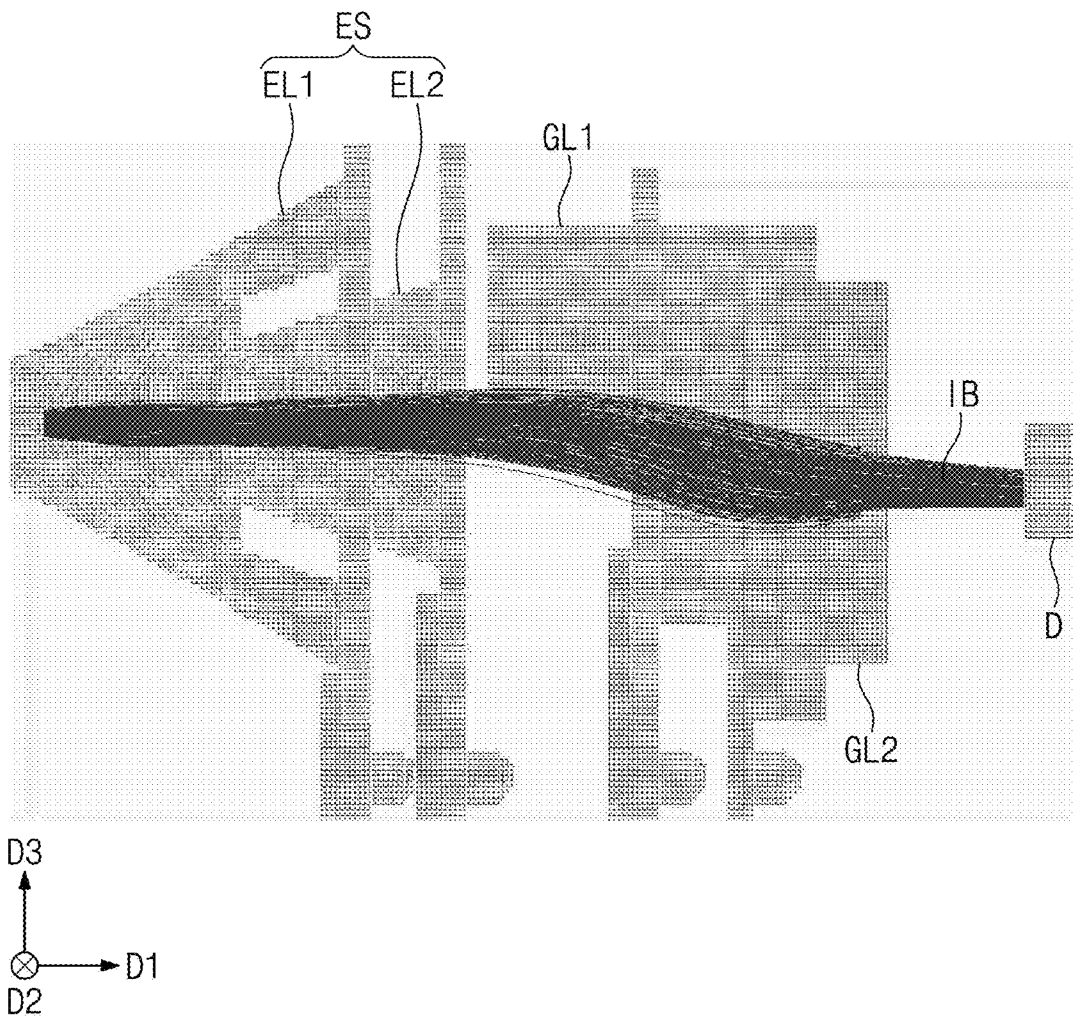
FIGS. 7 and 8 are simulation pictures for explaining a path and transmission efficiency of ion beam within the ion lens part of the mass spectrometer according to an embodiment of the present invention.
Figure 8:
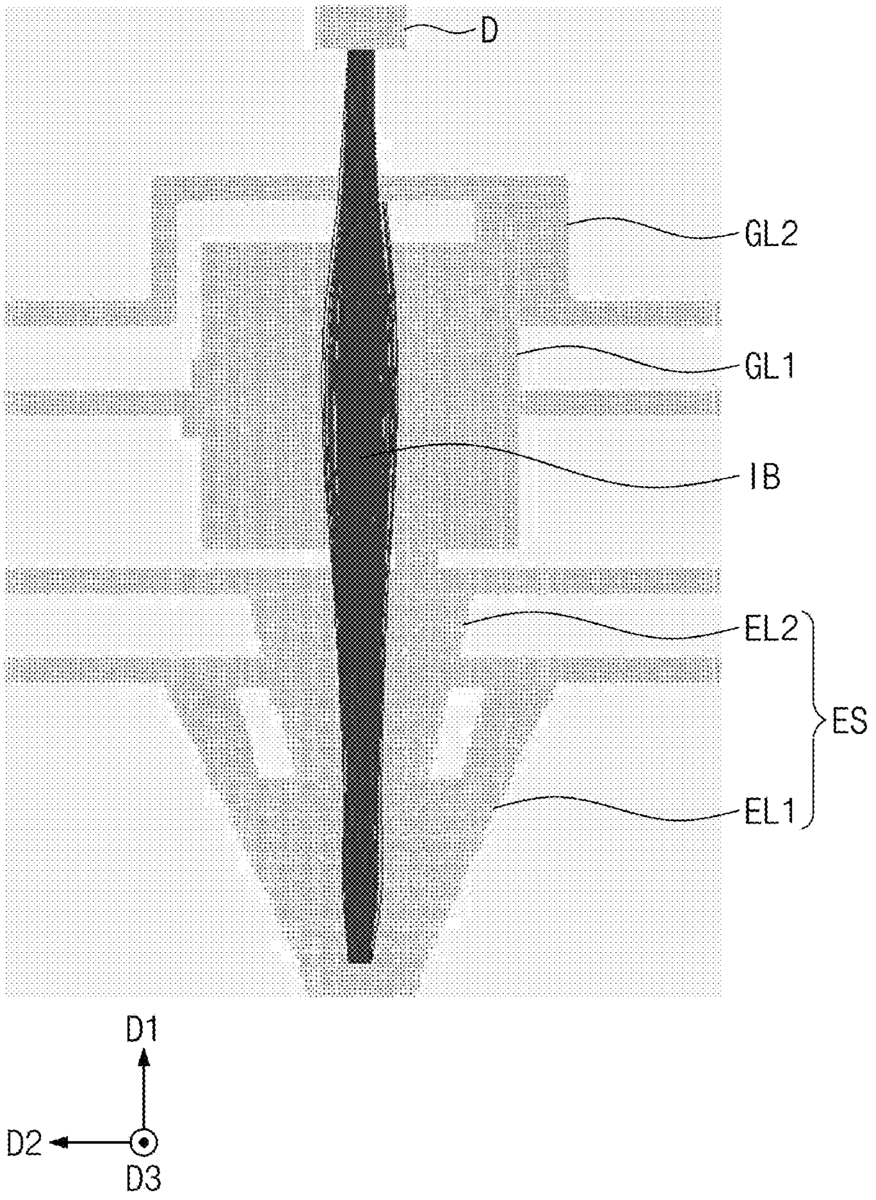

The central axis of the inner space of the second portion GL1*b* of the first guiding lens GL1 may extend in the first direction D1 and be defined as a second axis AX2 spaced apart from the first axis AX1 and the third direction D3. The first portion GL1*a* of the first guiding lens GL1 may be spaced apart from the second axis AX2 and the third direction D3, but this is only an example, and the present invention is not limited thereto. The first portion GL1*a* may extend below the second axis AX2. In this specification, the central axis of the first guiding lens GL1 may refer to the central axis of the internal space of the second portion GL1*b* of the first guiding lens GL1. The second axis AX2 may be spaced a first distance OAD1 from the first axis AX1 in the third direction D3. The second axis AX2 may be spaced a second distance OAD2 from the third axis AX3, which is the central axis of the through-hole 400 of the second guiding lens GL2, in the third direction D3. Each of the first distance OAD1 and the second distance OAD2 may be, for example, about 1 mm to about 3 mm. FIGS. 7 and 8 are simulation pictures for explaining a path and transmission efficiency of ion beam within the ion lens part of the mass spectrometer according to another embodiment of the present invention.

More particularly, FIG. 7 is a simulation diagram illustrating a cross section cut along a plane parallel to the first direction D1 and the third direction D3, and FIG. 8 is a simulation diagram illustrating a cross section cut along a plane parallel to the first direction D1 and the second direction D2. Here, current due to a space charge effect may be about 2 μA, and ion beam IB containing ions to be analyzed was set to have a mass range of about 40 amu (atomic mass unit) to about 238 amu.

In FIGS. 7 and 8, it is illustrated and explained that a detector D is disposed at a rear end for the purpose of measuring transmittance efficiency of ions passing through the ion lenses EL1, EL2, GL1, and GL2, but the mass spectrometer according to the present invention is not limited thereto, and the reaction part 50 (see FIG. 1) and the mass separation part 60 (see FIG. 1) may be provided between the ion lenses EL1, EL2, GL1, and GL2 and the detector D.

Referring to FIGS. 7 and 8, in the simulation, the ion beam IB may reach the detector D with a transmittance efficiency of 82.5%. In other words, the ion beam IB may proceed with high transmission efficiency to the detector D by the extraction lens structure ES having the first axis AX1 as the central axis thereof, the first guiding lens GL1 having the second axis AX2 spaced apart from the first axis AX1 as the central axis thereof, and the second guiding lens GL2 having the third axis AX3, which is spaced apart from the second axis AX2, as the central axis thereof. At a front end of the second guiding lens GL2, a width of the ion beam IB in the third direction D3 may be less than or equal to a width of the through-hole 400 (see FIG. 2) of the second guiding lens GL2 in the third direction, and a width of the ion beam IB in the second direction D2 may be less than or equal to a width of the through-hole 400 (see FIG. 2) of the second guiding lens GL2 in the second direction D2.

The mass spectrometer according to the present invention may improve resolution and measurement accuracy by improving transmission efficiency of the ions to be analyzed.

Although the embodiment of the present invention is described with reference to the accompanying drawings, those with ordinary skill in the technical field of the present invention pertains will be understood that the present invention can be carried out in other specific forms without changing the technical idea or essential features. Therefore, the above-disclosed embodiments are to be considered illustrative and not restrictive.

INDUSTRIAL APPLICABILITY

The present disclosure relates to the mass spectrometer. More particularly, it may be used for a mass spectrometer including the extraction lens structure having the first central axis, the first guiding lens having the second central axis spaced apart from the first central axis, and the second guiding lens having the third central axis spaced apart from the second central axis.

The invention claimed is:

1. A mass spectrometer comprising:

a sample introduction part;

an ionization part connected to the sample introduction part and configured to ionize the sample introduced from the sample introduction part;

an ion lens part comprising an extraction lens structure adjacent to the ionization part and first and second guiding lenses configured to guide an ion beam extracted from the extraction lens structure; and a detection part configured to detect the ion beam, wherein a central axis of the extraction lens structure is a first axis extending in a first direction, a central axis of the first guiding lens is a second axis spaced a first distance from the first axis, and a central axis of the second guiding lens is a third axis spaced a second distance from the second axis.

2. The mass spectrometer of claim 1, wherein the internal space of the first guiding lens comprises:

a first space extending from a front opening of the first guiding lens in the first direction;

a second space extending from the first space in a direction inclined with respect to the first direction; and a third space extending from the second space to a rear opening of the first guiding lens in the first direction.

3. The mass spectrometer of claim 2, wherein the central axis of the first space coincides with the first axis, the central axis of the second space has an inclination with respect to the first axis and intersects the second axis, and the central axis of the third space coincides with the third axis.

4. The mass spectrometer of claim 1, wherein the first guiding lens comprises a plurality of ion lenses having a uniform aperture width.

5. The mass spectrometer of claim 1, wherein the first guiding lens comprises a first portion between the extraction lens structure and the second guiding lens and a second portion integrally connected to the first portion between the first portion and the second guiding lens, wherein the first portion has a shape similar to a hollow pillar shape cut along a plane comprising the central axis thereof, the second portion has a hollow pillar shape, and the second axis is defined as a central axis of an internal space of the second portion.

6. The mass spectrometer of claim 5, wherein a lower portion of the first portion is opened toward an empty space between the extraction lens structure and the second portion.

7. The mass spectrometer of claim 5, wherein the second portion is in contact with the second guiding lens.

8. The mass spectrometer of claim 1, wherein the second guiding lens has a plate shape having a through-hole, and the third axis is defined as a central axis of the through-hole.

9. The mass spectrometer of claim 1, wherein each of the first distance and the second distance is 1 mm to 3 mm.

10. The mass spectrometer of claim 9, wherein the second distance is less than the first distance.

11. The mass spectrometer of claim 1, further comprising:

an interface part between the ionization part and the ion lens part; and a mass separation part between the ion lens part and the detection part.

12. The mass spectrometer of claim 11, wherein the extraction lens structure comprises a first extraction lens adjacent to the interface part and a second extraction lens between the first extraction lens and the first guiding lens, wherein each of the first and second extraction lenses has a hollow cone shape.

13. The mass spectrometer of claim 12, wherein the first extraction lens has at least one or more side openings passing through a sidewall thereof to expose an inner sidewall thereof.

14. The mass spectrometer of claim 1, wherein the sample introduction part comprises:

a nebulizer configured to change a liquid sample into an aerosol state; and a spray chamber connected to the nebulizer and configured to control a flow of aerosols so that only relatively small-sized aerosols move to the ionization part through a temperature control.

15. The mass spectrometer of claim 14, wherein the ionization part comprises:

a first tube connected to the spray chamber of the sample introduction part and disposed at the innermost side;

a third tube having an end facing the ion lens part and disposed at the outermost side;

a second tube disposed between the first tube and the third tube; and an induction coil having a spiral shape that surrounds the outside of the third tube.

* * * * *